United States Patent [19]

Fogarty et al.

[11] Patent Number: 4,484,408
[45] Date of Patent: Nov. 27, 1984

[54] TALKING FIGURE PLAY SET

[75] Inventors: A. Edward Fogarty; Bonnie R. Fogarty, both of Sarasota, Fla.

[73] Assignee: Mattel, Inc., Hawthorne, Calif.

[21] Appl. No.: 403,147

[22] Filed: Jul. 29, 1982

[51] Int. Cl.³ .............................................. A63H 5/00
[52] U.S. Cl. ................................... 446/299; 446/301; 369/63; 272/31 P
[58] Field of Search ................ 446/118, 175 AR, 126, 446/232; 272/31 P; 273/142 K; 369/63, 79, 177

[56] References Cited

U.S. PATENT DOCUMENTS

| | | | |
|---|---|---|---|
| 1,399,757 | 12/1921 | Emerson | 46/175 AR X |
| 1,451,022 | 4/1923 | Haskell | 369/63 |
| 1,479,847 | 1/1924 | Widmann | . |
| 1,518,165 | 12/1924 | Richardson | . |
| 1,542,542 | 6/1925 | Echevarria | 46/118 X |
| 2,840,949 | 7/1958 | Faulkner | . |
| 3,811,686 | 5/1974 | Watanabe | 274/9 C |
| 3,825,268 | 7/1974 | Holland et al. | 274/9 C |
| 4,123,065 | 10/1978 | Watanabe | 369/63 X |

OTHER PUBLICATIONS

Fisher–Price Catalog, 1982 Edition, pp. 20, 21 and 25.
Mattel Catalog, 1971 Edition, p. 24, "Rock Flowers", Mattel, Inc., Hawthorne, California.
Unpublished Memorandum, dated Feb. 26, 1968, entitled "Talking Town", prepared by Conrad Sloop, Mattel, Inc., Hawthorne, Calif.
Kenner Catalog, 1975 Edition, p. 88, "Talking Blocks", Kenner Products, Cincinnati, Ohio.

Primary Examiner—F. Barry Shay
Attorney, Agent, or Firm—Benjamin P. Reese, II

[57] ABSTRACT

A talking figure play set comprising an environmental structure having a record player with an upwardly pointing stylus on its tone arm and a plurality of human figures or animal figures, or both, each having an open-bottom base with a phonograph record permanently recessed therein. The tone arm with its upwardly pointing stylus is recessed in a circular opening in the housing of the record player along with support means, such as a ledge or rim, for the open-bottom bases of the various figures. The phonograph record recessed in the open-bottom base of each figure has a sound recording on spiral grooves which is compatible with the appearance of the figure. When the open-bottom base of one of the figures is inserted in the circular opening in the housing of the record player, the record player is turned on to reproduce the sound recording associated with the particular figure while that figure remains stationary to allow a child to perceive the figure as a talking figure.

6 Claims, 11 Drawing Figures

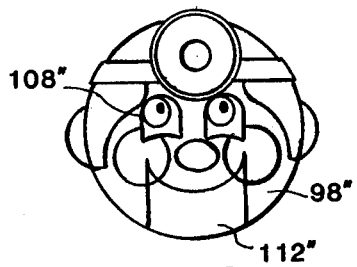
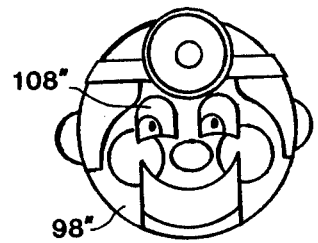
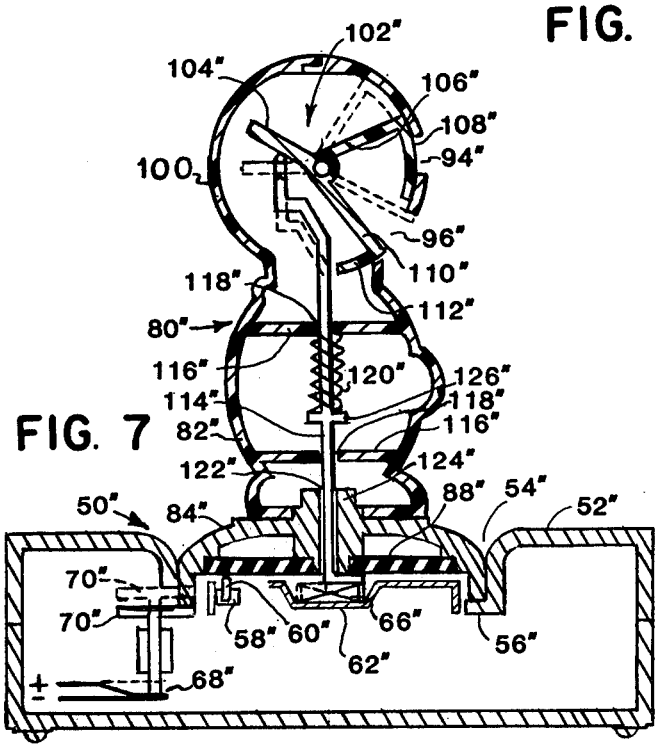
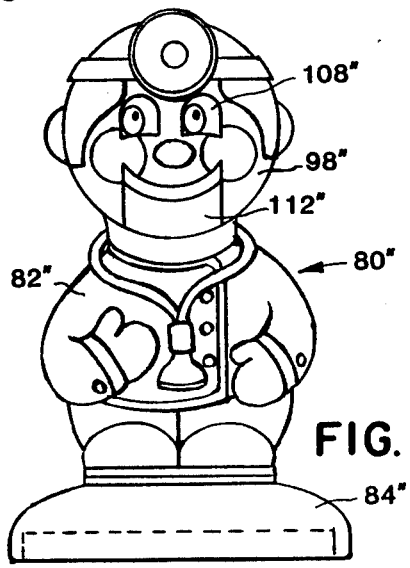
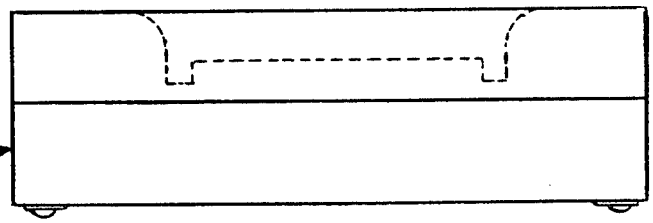

TALKING FIGURE PLAY SET

BACKGROUND OF THE INVENTION

This invention relates generally to a talking figure play set, and, more particularly, to such a play set comprising an environmental structure having a record player with an upwardly pointing stylus and a plurality of human figures or animal figures, or both, each having an open-bottom base with a phonograph record permanently recessed therein.

Various play sets comprising an environmental structure and a plurality of human figures or animal figures, or both, are provided by the prior art. It is not believed, however, that the prior art provides such a play set having talking figures. It can be readily appreciated that the use of talking figures in such a play set would not only enhance its play value but also enhance its educational value. Both the play value and educational value of such a play set are likely to be substantially enhanced if each figure in the play set conveys a spoken message which is compatible with its physical appearance. It is believed that such a talking figure play set would be particularly suitable for use by children in the 3–7 year old age group.

While the prior art provides talking dolls and other similar human and animal figures having internal talking means, it is not believed that such figures are particularly suitable for use as elements of a talking figure play set. Preferable, play sets are comprised of a plurality of relatively inexpensive, rugged components. The talking dolls and other similar human and animal figures provided by the prior art are typically neither rugged nor inexpensive since each such figure has a separate internally positioned sound reproducing device and sound recording as its talking means. The internally positioned sound reproducing device and sound recording typically used as the talking means for such a figure is either a battery-powered electrical record player and phonograph record or a mechanical record player and phonograph record. It is believed that a talking figure play set having a plurality of relatively inexpensive, rugged components is possible if a single record player is positioned in the environmental structure of the play set to function as a sound reproducing device for sound recordings associated with each of the various figures included in the play set.

SUMMARY OF THE INVENTION

The present invention provides a talking figure play set. More particularly, the present invention provides such a play set comprising an environmental structure having a record player with an upwardly pointing stylus and a plurality of human figures or animal figures, or both, each having an open-bottom base with a phonograph record permanently recessed therein.

With the talking figure play set of the present invention, a record player is positioned at a convenient location in an environmental structure. In its preferred embodiment, the environmental structure is divided into separate environmental areas which simulate actual natural or man made environments which are familiar to children in the 3–7 year old age group. The record player which is positioned in the environmental structure has a housing with a circular opening. A tone arm having an upwardly pointing stylus is recessed in the circular opening of the housing. Additionally, a support means is recessed in the circular opening of the housing.

A plurality of human or animal figures are provided for use with the talking figure play set of the present invention. Each such figure has a body and a circular, open-bottom base with a phonograph record recessed therein. The record recessed in the open-bottom base of each such figure has a sound recording on spiral grooves which is compatible with the appearance of the particular figure. When a child desires to hear one of the figures talk, he or she inserts the open-bottom base of the figure in the opening in the housing of the record player. Since both the open-bottom base of the figure and the opening in the housing of the record player are circular, the child can position the figure such that it faces her or him regardless of her or his location around the environmental structure and record player. The open-bottom base depresses a push button of an on-off switch to turn on the record player as it comes to rest on the support means recessed in the circular opening in the housing of the record player. When the sound recording has been heard, the child removes the figure to release the push button, and, thereby, stop the operation of the record player.

Since the open-bottom base is circular, it will fit tightly in the circular opening in the housing of the record player, assuming, of course, that both the open-bottom base and the circular opening are of appropriate dimensions. Thus, the figure will remain stationary while the record player reproduces the sound recording on the spiral grooves of the phonograph record to permit the child to better perceive the talking action of the figure. And, of course, since the phonograph record is recessed in the open-bottom base, the probability that the record will be scratched or otherwise damaged by a child during his or her play activities with the figures in the play set of the present invention is substantially reduced.

BRIEF DESCRIPTION OF THE DRAWINGS

FIG. 7 is an elevational view, in cross section of the record player in FIG. 3 and a non-rotating human figure having an open-bottom base with a non-rotating phonograph record recessed therein and mechanical means for continuously moving its eyes and mouth as the tone arm of the record player rotates.

FIG. 8 is a front elevational view of the non-rotating human figure in FIG. 7 showing the appearance of its eyes and mouth when the tailpiece of the forked lever in its interior is positioned in an essentially horizontal plane.

FIG. 9 is a front elevational view of the head of the non-rotating human figure in FIG. 7 showing the appearance of its eyes and mouth when the tailpiece of the forked lever in its interior is positioned at its lowermost location.

FIG. 10 is a front elevational view of the head of the non-rotating human figure in FIG. 7 showing the appearance of its eyes and mouth where the tailpiece of the forked lever in its interior is positioned at its uppermost location.

FIG. 11 is a front elevational view showing the exterior appearance of the record players in FIGS. 3, 5 and 7.

DETAILED DESCRIPTION OF THE PREFERRED EMBODIMENT

The preferred embodiment of the talking figure play set of the present invention is illustrated in FIGS. 1-11.

Figure 1:
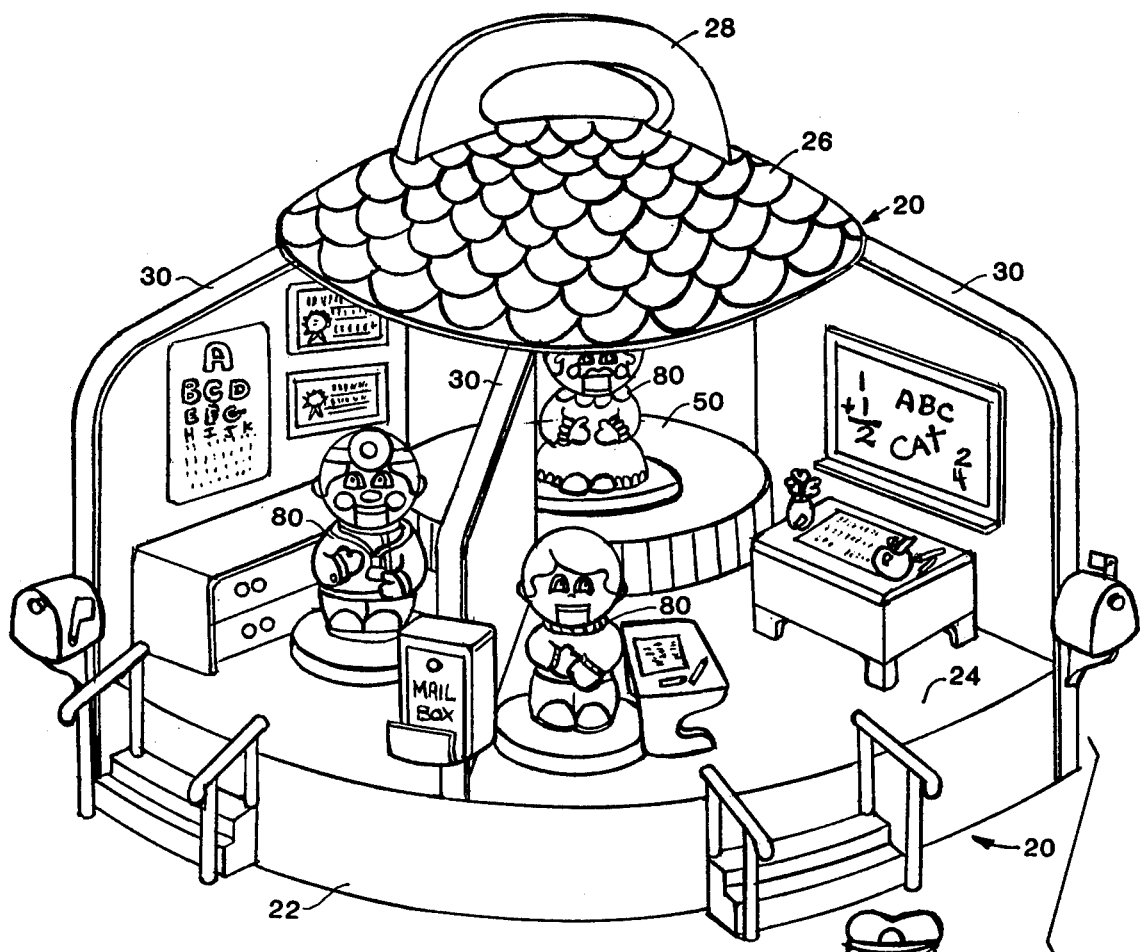
FIG. 1 is a front perspective view of one embodiment of the talking figure play set of the present invention.
Figure 2:
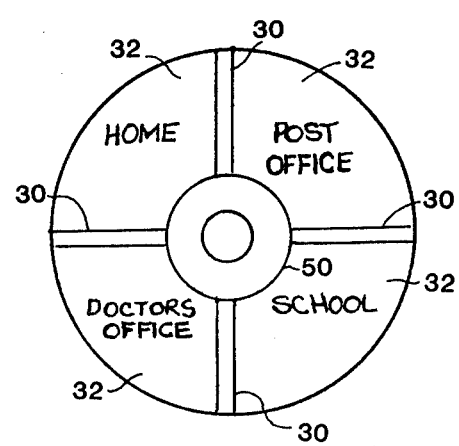
FIG. 2 is a diagramatic view showing the spatial arrangement of the separate environmental areas of the environmental structure of the talking figure play set in FIG. 1.

Referring to FIGS. 1 and 2, the play set which is illustrated comprises an environmental structure 20, a record player 50, and a plurality of 3-D human figures 80. Preferably, the environmental structure 20 is fabricated as one or more plastic components by a conventional molding process. The environmental structure 20 which is illustrated comprises a base 22 having an upper surface 24, a top 26 having a carrying handle 28, and a plurality of partitions 30. The partitions 30 divide the environmental structure 20 into a plurality of separate environmental areas 32 which simulate actual natural or man made environments, such as a home, a post office, a school and a doctor's office, familiar to children in the relevant age group. The record player 50 is positioned in the environmental structure 20 at a convenient location, such as at or near the center of the environmental structure 20 on the upper surface 24 of its base 22.

Each of the environmental areas 32 is decorated and ornamented appropriately for the actual environment which it simulates. If desired, appropriate toy furniture, toy implements, toy vehicles and the like can be provided for use in the various environmental areas 32 to further enhance the play value and educational value of the play set. As best illustrated in FIG. 1, the appearance of each of the human figures 80 is compatible with at least one of the environmental areas 32. Of course, since the present invention is mechanical and not ornamental in nature, the appearances of the various environmental areas 32 and figures 80 could differ substantially from those illustrated in the drawings. For example, the environmental areas 32 could simulate various out of door environments and the figures 80 could be animal figures compatible with such environments.

Figure 3:
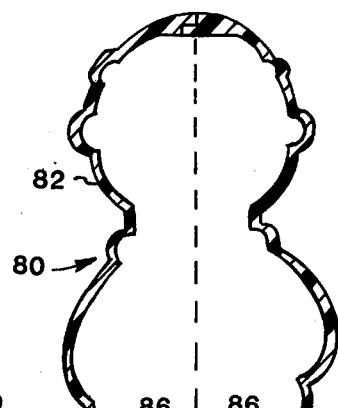
FIG. 3 is a front elevational view, in cross section, of a record player having a rotating tone arm with an upwardly pointing stylus and a non-rotating human figure having an open-bottom base with a non-rotating phonograph record recessed therein, both of which are suitable for use as components of the talking play set in FIG. 1.
Figure 4:
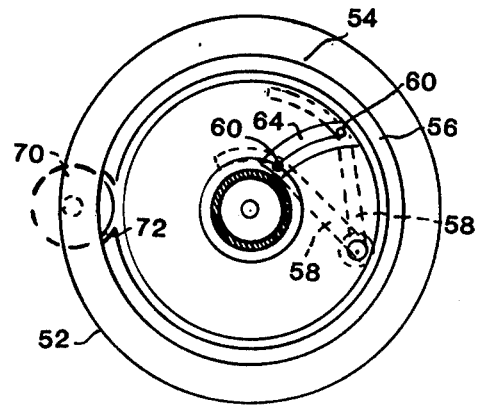
FIG. 4 is a top plan view of the recess in the upper surface of the record player in FIG. 3 showing the rotating tone arm, rotating tone arm shield and on-off push button.
Figure 6:
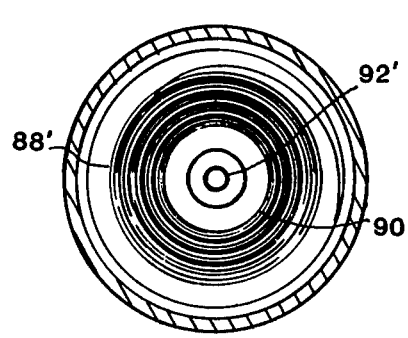
FIG. 6 is a bottom plan view of the non-rotating human figure in FIG. 5 showing the spiral grooved configuration of the rotating phonograph record recessed in its open-bottom base.

Referring to FIG. 3, one embodiment of the record player 50 positioned in the environmental structure 20 illustrated in FIG. 1 is illustrated in cross section without various of its internal operative components which are not critical to an understanding of the present invention. The record player 50 comprises a housing 52 having a circular opening 54 with a recessed support ledge or rim 56, a recessed rotating tone arm 58 with an upwardly pointing stylus 60, a rotating tone arm shield 62 having an opening 64 for the stylus 60, an on-off switch 68 having a push button 70 positioned above the horizontal plane of the recessed support ledge or rim 56, and the various unillustrated operative components. Various commercially available record players, such as the record player described and illustrated in U.S. Pat. No. 3,811,686 (the entire disclosure of which is incorporated herein by reference), are adaptable for use as the record player 50. It will be apparent, of course, from a comparison of FIG. 3 and the drawings of U.S. Pat. No. 3,811,686 that structural modifications are necessary before the record player described and illustrated in that patent, or any other commercially available record player, can function as the record player 50 illustrated in FIG. 3. Preferably, the housing 52 of the record player 50 is fabricated from a suitable plastic material by a conventional molding process. If desired, the housing 52 can be integrally formed with the environmental structure 20.

FIG. 3 not only illustrates the record player 50 in cross section but also illustrates a typical human figure 80 for use with the play set of the present invention in cross section. The human figure 80 comprises an essentially hollow body 82 and an open-bottom base 84 having a circular configuration. Preferably, both the body 82 and the base 84 are fabricated from a suitable plastic material by a conventional molding process. As illustrated, the body 82 and the base 84 are fabricated as separate components and joined by conventional means, such as a pair of screws 86. If desired, both the body 82 and the base 84 could be fabricated as a single component. In either case, a phonograph record 88 having a sound recording on spiral grooves 90 is recessed in the open-bottom of the base 84. As illustrated in FIG. 3, the phonograph record 88 is force fitted, glued or otherwise fixedly positioned in the open-bottom of the base 84.

When a child desires to hear one of the human figures 80 talk, he or she inserts the open-bottom base 84 of the particular human figure 80 in the circular opening 54 in the housing 52 of the record player 50. As the open-bottom base 84 is inserted in the circular opening 54, the push button 70 of the on-off switch 68 is pushed downward through the opening 72 in the recessed support ledge or rim 56 to close the electrical circuit of the record player 50. As illustrated in FIG. 3, the open-bottom base 84 fits tightly in the circular opening 54 and rests on the support ledge or rim 56 such that the entire human figure 80, including the phonograph record 88, remains stationary during operation of the record player 50. With the electrical circuit of the record player 50 closed as described, the record player 50 operates in the conventional manner, i.e. the upwardly pointing stylus 60 of the revolving tone arm 58 engages the spiral grooves 90 on the bottom surface of the phonograph record 88 and picks up the sound recording for amplification in the conventional manner. The child then hears the spoken message of the particular human figure 80 which she or he has selected. When the message of the human figure 80 has been heard, the child removes the human figure 80 to release the push button 70 of the on-off switch 68, and, thereby, open the electrical circuit of the record player 50 to stop its operation.

Figure 5:
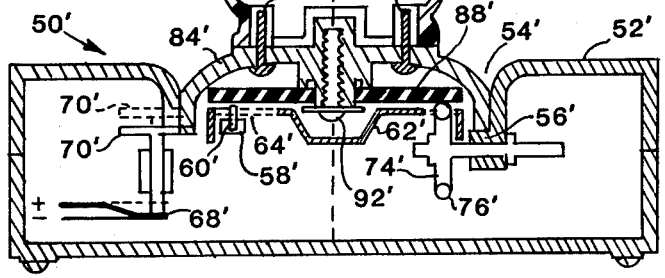
FIG. 5 is a front elevational view, in cross section, of a record player having a non-rotating tone arm with an upwardly pointing stylus and a non-rotating human figure having an open-bottom base with a rotating phonograph record recessed therein, both of which are suitable for use as components of the talking play set in FIG. 1.

It will be readily appreciated that the structural details of the record player 50 and human figure 80 which are illustrated in FIG. 3 can be varied without departing from the basic concepts of the present invention. For example, a record player 50' having a non-rotating tone arm 58' with an upwardly pointing stylus 60' is illustrated in FIG. 5. With a talking figure play set using the record player 50', a phonograph record 88' is rotatably positioned in the open-bottom of the base 84' of each of the human figures 80' by conventional means, such as a headed bolt 92. The record player 50' is provided with a drive wheel 74' having a rubber or soft plastic o-ring 76' which frictionally engages and rotates the phonograph record 88' as the drive wheel 74' rotates or other suitable means for rotating the phonograph record 88'. When the open-bottom base 84' with its recessed phonograph record 88' is inserted in the circular opening 54' in the housing 52', the human figure 80' remains stationary as the phonograph record 88' rotates during operation of the record player 50'.

The record player 50" illustrated in FIG. 7 is identical to the record player 50 illustrated in FIG. 3. However, the human figure 80" illustrated in FIG. 7 has a pair of eye openings 94" and a mouth opening 96" in the facial region 98" of its head 100". A forked lever 102" is pivotedly mounted in the interior of the head 100" of the human figure 80". As illustrated, the forked lever 102" comprises a tail piece 104", an upper prong 106" having a curved eye plate 108" with indicia simulating a pair of eyes, and a lower prong 110" having a curved chin plate 112". An operating arm 114" is vertically positioned in the interior of the body 82" by conventional means, such as a pair of parallel horizontal plates 116" having aligned cylindrical holes 118", and biased downward with a compression spring 120". The upper end of the operating arm 114" engages the tail piece 104" of the forked lever 102" and the lower end of the operating arm 114" projects downward through a vertical bore 122" along the center line of the cylindrical positioned element 124" of the open-bottom base 84" and rests on the upper surface of a cam 66" fixedly positioned on the upper surface of the rotating tone arm shield 62" of the record player 50" when the open-bottom base 84" is inserted in the cylindrical opening 54" of the housing 52" of the record player 50". When the open-bottom base 84" is not inserted in the cylindrical opening 54", the compression spring 120" forces the operating arm 114" downward until a stop 126" on the operating arm 114" engages the upper surface of the lower horizontal plate 116" and retains the operating arm 114" in the interior of the body 82" and open-bottom base 84".

As the tone arm 58" and tone arm shield 62" of the record player 50" rotate during normal operation, the cam 66" continuously moves the operating arm 114" upward and downward, and, thereby, continuously moves the tail piece 104" of the forked lever arm 102" upward and downward to pivot the upper prong 106" and lower prong 110". In this manner, the curved eye plate 108" and curved chin plate 112" are continuously moved to roll the eyes and open and close the mouth of the human figure 80". FIGS. 8, 9 and 10 illustrate the appearance of the human figure 80" with the tail piece 104" of the forked lever 102" moved to various positions by the operating arm 114". Since the record player 50 illustrated in FIG. 3 and the record player 50" illustrated in FIG. 7 are identical, it is possible to include human figures 80 of the type illustrated in FIG. 3 and human figures 80" of the type illustrated in FIG. 7 in the same talking figure play set. And, of course, both the figures 80 and the figures 80" could be animal figures if desired.

While the present invention has been disclosed in connection with its preferred embodiment, it should be understood that there may be other embodiments which fall within the scope and spirit of the invention as defined by the claims.

We claim:

1. A talking figure play set, comprising:
   (a) a record player having a housing with a geometrically regular opening, a non-rotating tone arm having an upwardly pointing stylus, a support means for supporting the base of a three-dimensional figure, and a drive means for rotating a phonograph record, said non-rotating tone arm, support means and drive means being recessed in said geometrically regular opening in said housing; and
   (b) at least one three-dimensional figure comprising a body and an open-bottom base having a phonograph record rotatably mounted therein, said phonograph record having spiral grooves with a sound recording thereon, and said open-bottom base being geometrically configured such that it rests on said support means when inserted in said geometrically regular opening in said housing of said record player and remains stationary when said upwardly pointing stylus of said non-rotating tone arm engages said spiral grooves of said phonograph record as said phonograph record rotates during operation of said record player.

2. A talking figure play set as recited in claim 1, further comprising an environmental structure.

3. A talking figure play set as recited in claim 1, wherein said drive means comprise a drive wheel which frictionally engages the surface of said phonograph record rotatably mounted in said open-bottom base of said three-dimensional figure to rotate said photograph record during operation of said record player.

4. A talking figure play set as recited in claim 3, further comprising an environmental structure.

5. A talking figure play set, comprising:
   (a) a record player having a housing with a geometrically regular opening, a rotating tone arm having an upwardly pointing stylus, a rotating tone arm shield mounted above said rotating tone arm, said rotating tone arm shield having a cam fixedly mounted on its upper surface, and a support means for supporting the base of a three-dimensional figure, said rotating tone arm, rotating tone arm shield and support means being recessed in said geometrically regular opening in said housing;
   (b) at least one three-dimensional figure comprising a body and an open-bottom base having a phonograph record fixedly mounted therein, said phonograph record having spiral grooves with a sound recording thereon, said open-bottom base being geometrically configured such that it rests on said support means when inserted in said geometrically regular opening in said housing of said record player and remains stationary when said upwardly pointing stylus of said rotating tone arm engages said spiral grooves of said phonograph record and rotates during operation of said record player, said body having a forked lever pivotedly mounted in its interior, said forked lever having a tail piece, an upper prong with a curved eye plate, a lower prong with a curved chin plate, and said body further having an operating arm moveably in its interior, said operating arm having its upper end in contact with said tail piece of said forked lever and its lower end in contact with the upper surface of said cam fixedly mounted on said rotating tone arm shield of said record player such that said curved eye plate and said curved chin plate are continuously moved during operation of said record player.

6. A talking figure play set as recited in claim 5, further comprising an environmental structure.

* * * * *

UNITED STATES PATENT AND TRADEMARK OFFICE
CERTIFICATE OF CORRECTION

PATENT NO.   : 4,484,408
DATED        : November 27, 1984
INVENTOR(S)  : Fogarty, A. Edward; and Fogarty, Bonnie R.

It is certified that error appears in the above-identified patent and that said Letters Patent is hereby corrected as shown below:

In Claim 3, Column 6, Line 39, replace "photograph" with --phonograph--.

In Claim 5, Column 7, Line 2, following "moveably", insert --mounted--.

Signed and Sealed this

Twenty-eighth Day of May 1985

[SEAL]

Attest:

DONALD J. QUIGG

Attesting Officer

Acting Commissioner of Patents and Trademarks